US012719684B2

(12) United States Patent
Schmidt et al.

(10) Patent No.: US 12,719,684 B2
(45) Date of Patent: Aug. 25, 2026

(54) METHOD AND SYSTEM FOR MANAGING DISTRIBUTION OF DATA

(71) Applicant: Schmidt-Morgan Corporation, Fredericksburg, TX (US)

(72) Inventors: Kristen Schmidt, Fredericksburg, TX (US); Luke Schmidt, Fredericksburg, TX (US); Rhys Morgan, Crawley (GB); Scott A. Vanderpoel, Golden, CO (US)

(73) Assignee: Schmidt-Morgan Corporation, Fredericksburg, TX (US)

( * ) Notice: Subject to any disclaimer, the term of this patent is extended or adjusted under 35 U.S.C. 154(b) by 0 days.

(21) Appl. No.: 19/331,166

(22) Filed: Sep. 17, 2025

(65) Prior Publication Data

US 2026/0230325 A1 Aug. 6, 2026

Related U.S. Application Data

(63) Continuation-in-part of application No. PCT/US2025/014238, filed on Feb. 1, 2025.

(51) Int. Cl.
*H04L 9/32* (2006.01)
*H04L 9/00* (2022.01)

(52) U.S. Cl.
CPC .............. *H04L 9/3213* (2013.01); *H04L 9/50* (2022.05)

(58) Field of Classification Search
CPC ................................ H04L 9/3213; H04L 9/50
See application file for complete search history.

(56) References Cited

U.S. PATENT DOCUMENTS 10,735,197 B2 8/2020 Sundaresan et al.
10,990,584 B1 4/2021 Basak et al.
11,250,507 B2 * 2/2022 Xu .................... G06Q 20/3827
11,531,783 B2 * 12/2022 Hamel .................. H04L 63/102
11,552,936 B2 1/2023 Call et al.
11,783,011 B1 * 10/2023 Lipton .................... G06F 21/10 726/26

(Continued)

FOREIGN PATENT DOCUMENTS

EP 4524798 A1 * 3/2025 ......... G06F 21/6218
KR 20240115763 A * 7/2024 ........... G06Q 20/367

(Continued)

OTHER PUBLICATIONS

Machine translation of Lee, KR 10-2024-0115763, pp. 1-2 (Year: 2024).*

(Continued)

*Primary Examiner* — Christopher A Revak
(74) *Attorney, Agent, or Firm* — Baker Botts L.L.P.

(57) ABSTRACT

A system or computerized method for managing the distribution of data includes initiating a request for data on behalf of a first party to a second party having custody of the data, issuing a tokenized credential representing the first party and a dataset comprising the data, storing the tokenized credential on a blockchain platform, providing a proof of identity of the first party to the tokenized credential, and allowing the first party to access the data of the tokenized credential in response to the proof of identity of the first party. The token credential can be revoked when the data is accessed by the first party.

20 Claims, 14 Drawing Sheets

The Owner updates the credential to remove the Recipient.

(56) References Cited

U.S. PATENT DOCUMENTS

| | | | | |
|---|---|---|---|---|
| 11,973,874 | B1 * | 4/2024 | Mordan | H04L 9/50 |
| 12,306,994 | B2 * | 5/2025 | Wilbert | H04L 9/32 |
| 2009/0328177 | A1 * | 12/2009 | Frey | H04L 9/3213 726/9 |
| 2019/0036700 | A1 * | 1/2019 | Sundaresan | H04L 9/30 |
| 2023/0070586 | A1 | 3/2023 | Kapur et al. | |
| 2024/0256691 | A1 * | 8/2024 | Hwang | G06Q 20/389 |
| 2025/0173729 | A1 * | 5/2025 | Zhang | G06Q 20/382 |
| 2025/0182111 | A1 * | 6/2025 | Ben-Ari | H04L 9/3247 |
| 2025/0254133 | A1 * | 8/2025 | De Castro Marchese | H04L 47/822 |

FOREIGN PATENT DOCUMENTS

| | | | | |
|---|---|---|---|---|
| WO | WO-2021184970 | A1 * | 9/2021 | G06F 21/602 |
| WO | WO-2023022252 | A1 * | 2/2023 | H04L 9/32 |
| WO | WO-2023159203 | A2 * | 8/2023 | H04L 9/085 |

OTHER PUBLICATIONS

International Search Report for International application No. PCT/US2025/014238. May 1, 2025.

* cited by examiner

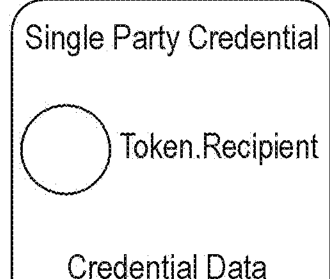

Proof: 14454EFA3CD109
Size: 100Mb
Timestamp: 1798257000

This credential could be used to allow a single party access to the data.

The Owner/Custodian here are the same, and there is a single party that requests access to the data.

The token is representative of the intended recipient.

The credential includes the proof of the dataset - such as a hash - and the size. There is also a timestamp included to validate & record when the request was made.

FIG. 4

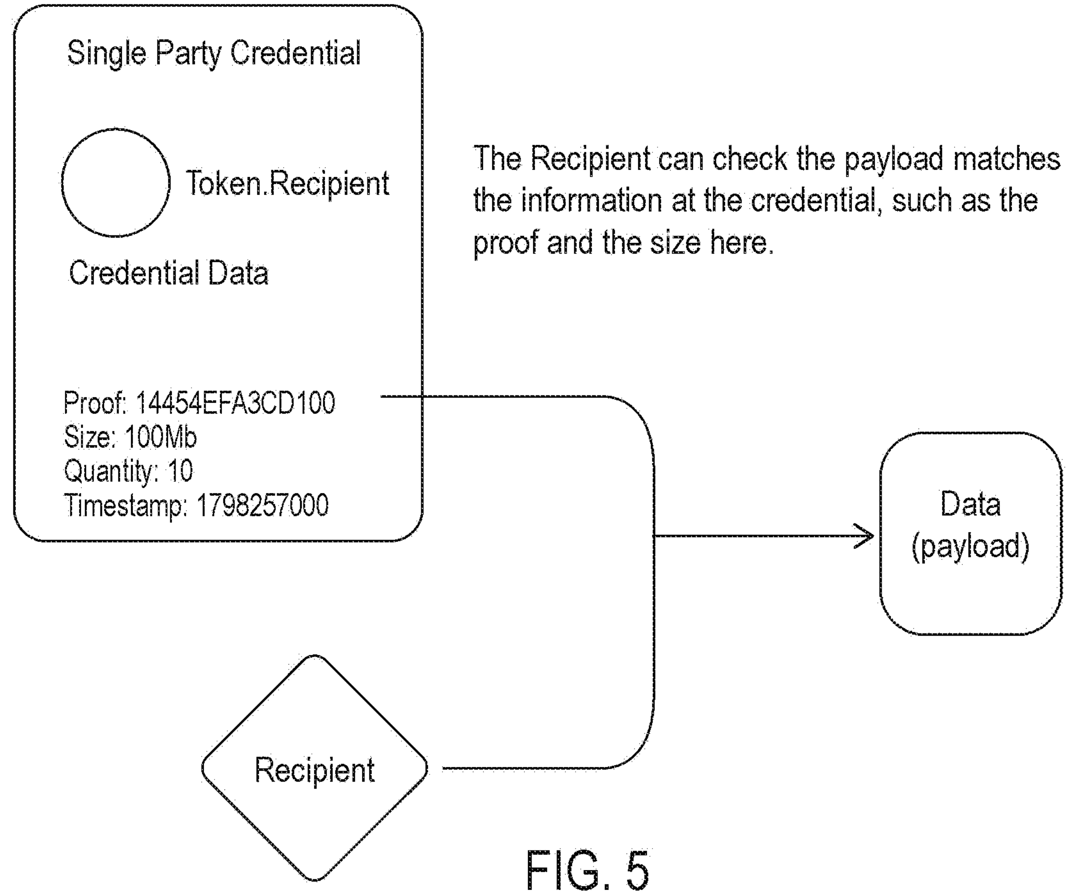

FIG. 5

The data at the credential changes as needed depending on the needs of the system.

Here the data proofs updates to reflect the data that Recipient receives.

This includes the new proof for the new dataset & decrements the Quantity (Number of uses).

Token.Dataset
Token.Owner

Dataset Credential

Credential Data

Proof: 14454EFA3CD109
Class: C
Quantity: 100
Timestamp: 1798257000

This Credential represents a Dataset.

This is managed by a Owner/Custodian, and could be used to lease out or distribute data as a service.

The token has a specific dataset identifier.

The credential data includes a proof, a classification, quantity of requests, and a timestamp.

This example credential would be used to allow a data class access (such as anonymous user data) to be distributed to trusted parties (who have Class C access).

FIG. 7

Multi Party Credential

Credential Data

Proof: 14454EFA3CD109
Recipient: X
Timestamp: 1798257000

This Credential is used to separate the Owner and Custodian of the data.

The Custodian manages the data on behalf of the Owner, and validates the Recipient(s) when the request for access is made.

The token is representative of the intended recipient.

The credential data includes a proof - such as the hash - of the dataset, and some identifier of the owner and a timestamp.

FIG. 8

This credential is used to manage data according to its Recipient, instead of the Owner.

This is managed by the Owner or Custodian and grants access as specified.

The token here represents the recipient of the dataset.

The credential data here provides a proof of some data (such as the last request), the class of data the recipient has access to and a timestamp.

The Recipient makes data requests with the credential to verify with the Custodian.

The credential is updated to account for the request and the Recipient receives the data payload.

The Owner updates the credential to remove the Recipient.

Perpetual credentials with specific levels of access

The AI Agent makes data requests with no credential to verify with the Verifier.

The credential is updated to account for the request and the AI Agent receives the data payload.

The AI Agent makes data requests with the credential to verify with the Verifier. If the credential/request is valid the external service executes the request.

The credential is updated to account for the request and the AI Agent receives the response payload.

The AI Agent makes data requests with the credential to verify with the Verifier. If the credential is valid the AI Agent 2 executes the request.

The credential is updated to account for the request and the AI Agent receives the response payload.

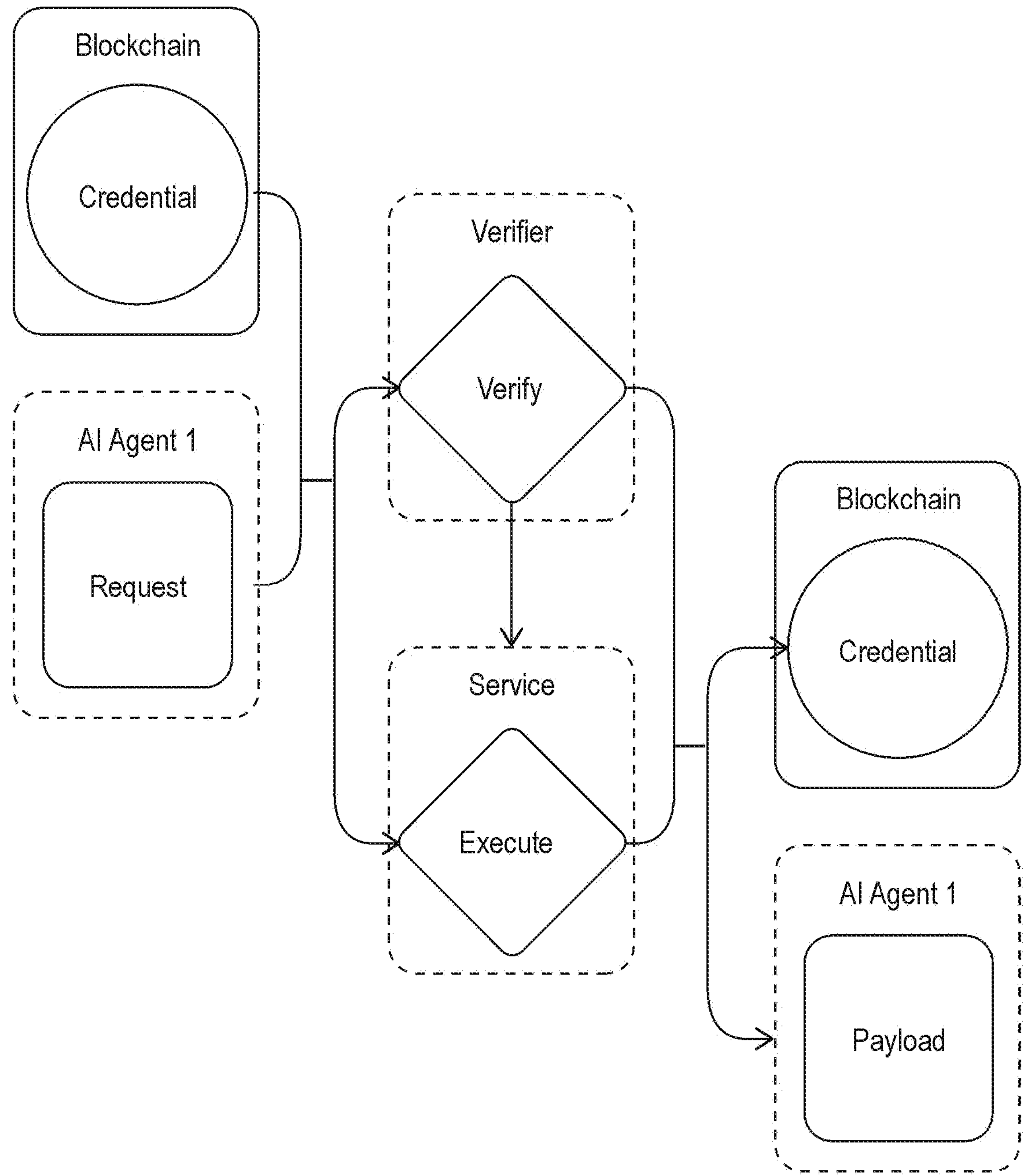

Requests and Credentials Validation can be done in parallel as well as in series, here an AI Agent makes the request with a credential. The Verifier validates the credential and communicates with the Service to confirm the action AND receive some information about the output response (such as a hash or some other proof).

The Service sends the valid response to the agent and the Verifier updates the credential on the blockchain.

FIG. 18

METHOD AND SYSTEM FOR MANAGING DISTRIBUTION OF DATA

CROSS REFERENCE TO RELATED APPLICATIONS

This application is a continuation-in-part of International Application No. PCT/US2025/014238, filed Feb. 1, 2025, which is incorporated herein by reference.

TECHNICAL FIELD

The present invention relates to computing technology. An embodiment of the invention comprises a system for managing distribution of datasets or data using a blockchain.

BACKGROUND

The distribution and sharing of data is ubiquitous in today's economy and society. Often, highly sensitive, confidential and/or valuable information must be shared among different entities via the internet. As the distribution of valuable data over the internet so have efforts to It is imperative to maintain and distribute such data securely and to be able to verify its accuracy. Failure to do so can lead to significant adverse legal and financial consequences for the entity distributing the data as well as the individual to whom the data pertains. For example, there can be an unauthorized disclosure of a person's medical or financial information.

Known methods to secure data distribution have shortfalls and inadequacies. For example, physical credentials, such as cards, can be cloned or stolen. Standard cryptographic credentials can be cloned from a central database, leaked or simply recreated. Typical access logs can be deleted, edited or never recorded.

A blockchain is a type of computing architecture in which a record of transactions can be maintained across multiple independent computers linked in a peer-to-peer network. A peer-to-peer distributed database or ledger of transactions is maintained, which is not controlled by a single organization or entity. As such, a blockchain can provide the cost-efficient creation of a digital record of transactions without requiring a central point of control.

U.S. Pat. No. 10,476,879, which is incorporated herein by reference, discloses a method for blockchain authentication via token verification. U.S. Pat. No. 10,735,197, which is incorporated herein by reference, discloses a method for blockchain based credential and token management. U.S. Pat. No. 11,552,936, which is incorporated herein by reference, discloses a method of managing dynamic credentials.

SUMMARY

One object of the present invention is to provide a secure method or system for sharing valuable and/or confidential data. Another object of the invention is to provide a method and/or system for managing distribution of datasets or data using blockchain. These and other objects of the invention can be achieved in the various embodiments of the invention disclosed herein.

An embodiment of the invention comprises a method or system of data distribution, management and validation.

An embodiment of the invention comprises a method or system for managing the distribution or transfer of datasets via a blockchain using tokenized credentials.

According to an embodiment of the invention, tokenized credentials are used to enable trusted management of data as a verification and validation mechanism.

According to an embodiment of the invention, the tokenized credentials are dynamic credentials.

According to an embodiment of the invention, the method or system facilitates the distribution of datasets to verified parties, enabling the validation of complex datasets by all parties without sharing the dataset directly.

An embodiment of the invention comprises a computerized method for managing distribution of data that comprises initiating a request for data on behalf of a first party to a second party having custody of the data; issuing a tokenized credential representing the first party and a dataset comprising the data; storing the tokenized credential on a blockchain platform; providing a proof of identity of the first party to the tokenized credential; and allowing the first party to access the data of the tokenized credential in response to the proof of identity of the first party. The token credential can be revoked when the data is accessed by the first party.

Another embodiment of the invention comprises a computerized method for managing distribution of data comprising initiating a request for data on behalf of a first party to a second party having custody of the data, issuing a tokenized credential, the tokenized credential representing the first party and the data, storing the tokenized credential on a blockchain platform, storing the data external to the blockchain platform, providing a proof of identity of the first party to the tokenized credential, and allowing the first party to access the data of the tokenized credential in response to the proof of identity of the first party.

According to an embodiment of the invention, the first party can be a recipient of the data, and the second party can be a custodian of the data. The recipient initiates a request for data to the custodian.

According to an embodiment of the invention, the proof of identity of the first party can be a wallet credential or platform user identification.

According to an embodiment of the invention, a timestamp is recorded on the blockchain platform each time the data is accessed.

According to another embodiment of the invention, the tokenized credential includes a proof of the data, whereby validity of the data can be verified. The validity of the data can be verified by checking the data accessed by the first party against the proof of the data of the tokenized credential.

According to an embodiment of the invention, there is one or more limitations on accessing the data. Fore example, there can be a deadline for accessing the data, a limit on the number of times to access the data, and/or an allowed frequency of access to the data.

According to an embodiment of the invention, the computerized method includes updating the tokenized credential.

According to an embodiment of the invention, the first party or the second party can be an artificial intelligence agent. The actions that can be taken by the artificial intelligence agent can be limited via parameters set by the tokenized credential.

Another embodiment of the invention comprises a system for managing distribution of data comprising a non-transitory computer readable storage medium comprising software having programming instructions that, when executed, cause a processor to issue a tokenized credential on a blockchain platform. The tokenized credential represents a first party and data to be accessed by the first party. The data is not stored on the blockchain platform. The first party is allowed to access the data in response to receiving proof of identity of the first party.

Another embodiment of the invention comprises a system for managing distribution of data comprising a non-transitory computer readable storage medium comprising software having programming instructions that, when executed, cause a processor to carry out one or more of the following: issue a tokenized credential for a first party, the tokenized credential representing the first party and a dataset comprising data to be accessed by the first party; store the tokenized credential on a blockchain platform; and allow the first party to access the data of the tokenized credential in response to receiving proof of identity of the first party. A timestamp can be recorded each time the data is accessed. The first party can initiate the request for data to a second party. The first party can be a recipient of the data, and the second party can be custodian of the data. The proof of identity of the first party can be a wallet credential, a platform user identification, or other suitable proof of identity.

According to an embodiment, the tokenized credential includes a proof of the data, such as a zero knowledge proof, and validity of the data can be verified by checking the data accessed by the first party against the proof of the data of the tokenized credential.

According to an embodiment of the invention, the tokenized credential includes at least one limitation on accessing the data. The tokenized credential acts as a limitation for accessing data, and contains metadata that defines further the limitations and parameters. For example, the limitation can be a deadline for accessing the data, a limit on the number of times to access the data, and/or an allowed frequency of access to the data.

According to an embodiment, the system includes a smart contract having rules for updating the tokenized credential.

By utilizing blockchain technology, all interactions with the system are recorded and immutable, so a full history of a credential is always available and cannot be edited. The system provides improved security, and has flexibility to be deployed according to the needs and specifications of the particular application in which the system is used.

Another embodiment of the invention comprises a system for managing distribution of data comprising a server and a non-transitory computer readable storage medium comprising software having programming instructions that, when executed, cause the server to execute one or more of the following: issue a tokenized credential in response to a request for data from a first party, the tokenized credential representing the first party and a dataset comprising the data; store the tokenized credential on a blockchain platform; and allow the first party to access the data of the tokenized credential in response to receiving proof of identity of the first party.

Another embodiment of the invention comprises a system for managing distribution of data comprising a server and a non-transitory computer readable storage medium comprising software having programming instructions that, when executed, cause the server to carry to issue a tokenized credential in response to a request for data stored outside of a blockchain platform from a first party. The tokenized credential represents the first party and the data, and the tokenized credential is stored on the blockchain platform. The first party is allowed to access the data of the tokenized credential in response to receiving proof of identity of the first party.

According to an embodiment of the invention, the server comprises an artificial intelligence (AI) agent, and the tokenized credential includes parameters limiting actions that can be taken by the artificial intelligence agent. For example, the tokenized credential allows the artificial intelligence agent to access only specific parts of the data.

BRIEF DESCRIPTION OF DRAWINGS

FIG. 4 is a schematic view of an embodiment of the invention;

FIG. 5 is a schematic view of an embodiment of the invention;

FIG. 7 is a schematic view of an embodiment of the invention;

FIG. 8 is a schematic view of an embodiment of the invention;

FIG. 18 is a schematic view of an embodiment of the invention; and

DETAILED DESCRIPTION OF PREFERRED EMBODIMENTS

Figure 1:
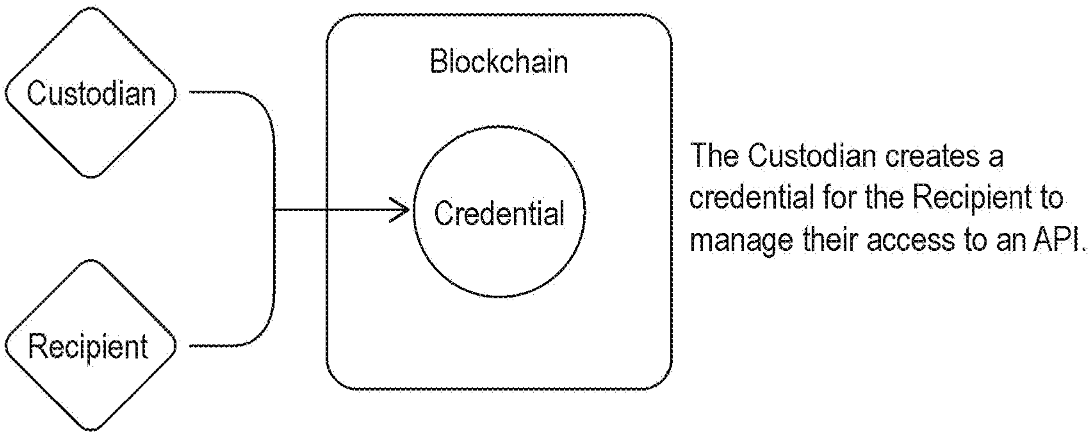
FIG. 1 is a schematic view of an embodiment of the invention.

An embodiment of the invention comprises a method or system for managing the distribution of datasets using a blockchain platform. The method or system can facilitate the distribution of datasets or data to verified parties, enabling the validation of complex datasets by all parties without sharing the dataset directly. The datasets can comprise proprietary, confidential, sensitive and/or otherwise valuable data. As such, there is an interest or incentive to keep the dataset secure and not accessible by unauthorized parties.

The system, according to an embodiment of the invention, uses a blockchain mechanism to track and enable data sharing through the issuance and revocation of credentials. A blockchain platform is used to store credentials immutably. The appropriate recipients of data can be verified, and a proof and timestamp of the data request can be generated. The system relies on an issued credential to enable the generation of the proof. Without the proof, a recipient will not be able to access the data.

According to an embodiment, the system stores representations of datasets (not the data itself), and the dataset can be verified by all parties involved to ensure it is the correct dataset. The system enables the tracking of who accesses it, when, and how many times they can access the data, which is stored outside of the blockchain. A credential can be issued in several ways, depending on the implementation and the intricacies of the blockchain that it works on.

According to an embodiment of the invention, the system uses tokenized credentials to enable trusted management of data as a verification and validation mechanism. The credentials can be set up in various ways depending on the needs of the system. The credentials can be implemented and organized based on the system requirements, and can be designated according to existing vendor relations, user accounts, and/or other means for the particular requirements. Credentials can be dynamic whereby they can be updated by permissioned parties under certain conditions, or when particular interactions occur.

The system uses digital tokens as credentials for authentication to grant access to data. Tokenized credentials are stored on a blockchain platform. The tokenized credentials reference/represent data that is being stored externally from the blockchain platform. The tokenized credentials have data references, but the data itself is not stored at the tokenized credential or on the blockchain. The tokenized credential is a validation proof of a party's permissions to access external data. The system can validate access to data stored outside of the blockchain through proofs generated on the blockchain. The system manages permissions to access external data held outside of the blockchain, by providing a mechanism to validate permissions and enabling the granting and revoking of permissions to third parties. The data can be stored off-chain in a dedicated hosted database that complies with relevant regulations, such as HIPAA regulations.

Figure 2:
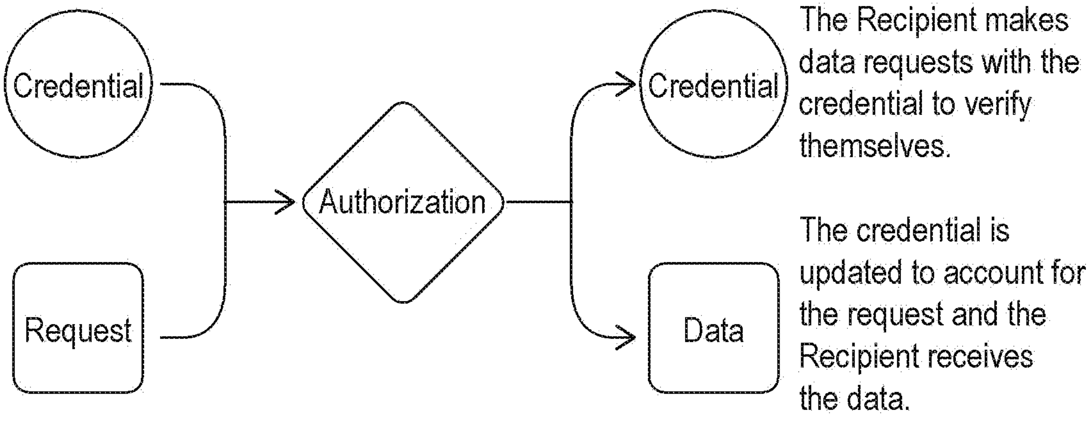
FIG. 2 is a schematic view of an embodiment of the invention.

In various embodiments, there can be two to four entities or roles involved with a given dataset or credential. In one embodiment, shown in FIGS. 1 and 2, the system can have two roles: Recipient and Custodian. Each of these roles can be performed by one or more parties or entities, and these roles can shift according to the actions being made on a given token/credential and are based on the parties managing and sharing data at any given point. Credentials are managed onchain, because they exist onchain and are updated onchain. However, there is also a level of management offchain to build the transactions needed to update them for signatures. The credential can be managed in different ways by different parties, for updating, adding/removing, distributing credentials.

In another embodiment, the system can include the following four roles: Issuer, Verifier, Owner, Custodian. Each of these roles can be performed by one or more entities or parties, and these roles can shift according to the actions being made on a given token/credential and are based on the parties managing and sharing data at any given point. The credential can be managed in different ways by different parties, for updating, adding/removing, distributing credentials.

Figure 3:
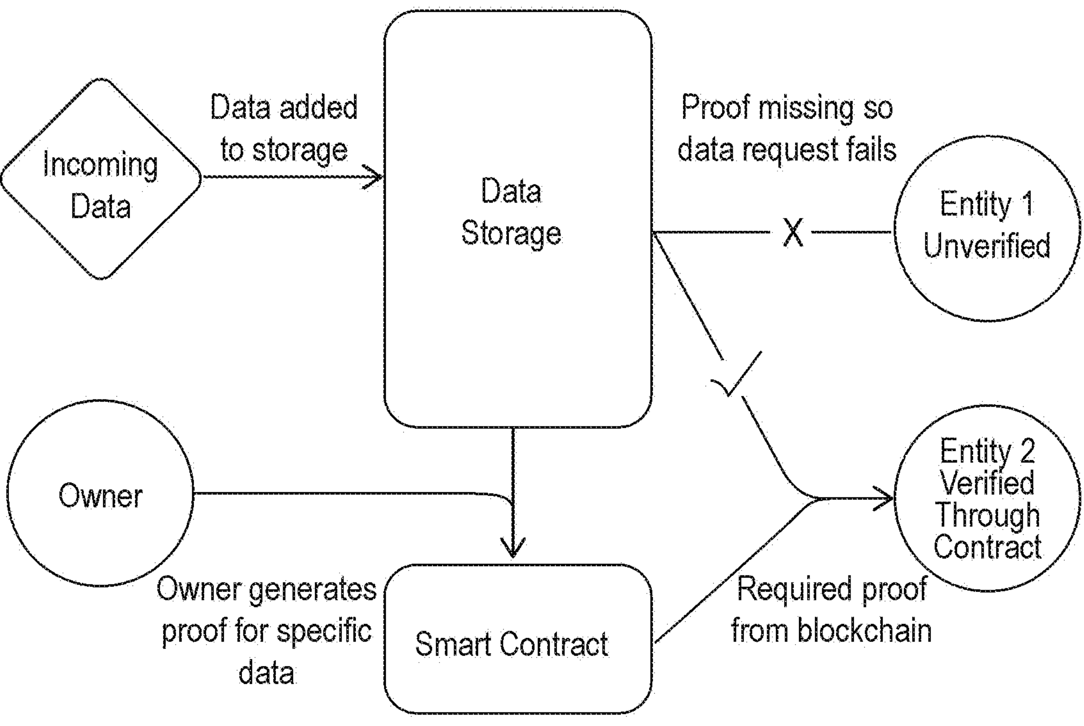
FIG. 3 is a schematic view of an embodiment of the invention.

As shown in FIG. 3, the system can use a smart contract having specific rules for updating and managing tokenized credentials. Depending on how the system is implemented it can be managed in two different ways. According to an embodiment, credentials can be issued by the Owner. According to another embodiment, credentials can be issued by the Verifier. In most applications, credentials are issued by the Verifier on behalf of the Owner. A smart contract can hold one or more tokens for each Owner, to allow specific datasets to be shared according to the needs of the Recipient(s). Each of these tokens can represent a specific data set or a catch all credential for a Recipient to access datasets.

A credential can be created to represent a party with access to data, a credential can be used to store a proof of the data (such as a zero knowledge proof), and/or a credential can be used to manage or update permissions, depending on its role in the application in which the system is being used.

The information stored at a credential can serve different purposes depending on the requirements and specifications of its implementation: (a) tokens can represent an individual or party, the datum can have the dataset proof and any other information that may be needed for the application; (b) tokens can represent a dataset and the datum can contain the proof and any parties with access permission; (c) tokens can represent an owner of the data, metadata can hold proofs of the dataset and party(s) who have permission to access data.

The structure of the system can be adapted for specific applications. Likewise the metadata stored about the credential can vary depending on the specific application.

In one embodiment, the system utilizes user-managed credentials. In this embodiment, a user's data needs to be shared with a party (recipient). The data to be shared is stored with another party (custodian). The recipient initiates a request for data from the user and the user is informed of the data request by the recipient. The user creates a credential and attaches the recipient to the metadata. The custodian then allows the recipient to access the specific data of the credential. Once the data has been received by the recipient, the recipient can validate it is the correct data by checking it against the proof in the metadata of the credential. All parties can validate that the dataset is correct according to this proof. User can then revoke the credential. Alternatively, the recipient and/or custodian can also revoke the credential according to permissions.

The system can be implemented in several ways depending on the limitations of the blockchain that it is leveraging, and the tools available according to its specifications. The system can utilize smart contracts to manage credentials. According to an embodiment, the system uses an extended Unspent Transaction Output (eUTXO) Model. With the eUTXO model, an address does not have a single point where all assets are stored, and instead live on multiple eUTXO models, unspent outputs.

A bank account can be used to illustrate the eUTXO model. A bank account typically holds money in a single place, which can be thought of as a "single pile"-all money in the bank account existing together in a single pile. However, with the eUTXO model, the money sits in multiple piles according to the transaction outputs that go there.

Each credential can be held in its own eUTXO, so it can be specified which credential is wanted to interact with specifically and there is an isolated space at this eUTXO for metadata called a datum.

A UTxO contains: a Token Credential; and Metadata/Datum.

A credential can be issued by minting a token. The token can be a fungible token, non-fungible token (NFT), or fractionalized token. Metadata is attached/updated at the datum. A credential is destroyed by 'burning' the asset which deletes it from the blockchain.

The mechanism will implement a space (address) to manage credentials, typically a smart contract, that will have specific logic that limits assets stored there, so that they are secured and limited in scope according to the logic. When a party requests or receives a dataset, there is a transaction signature and a record of access of who accessed what data and when.

Figure 6:
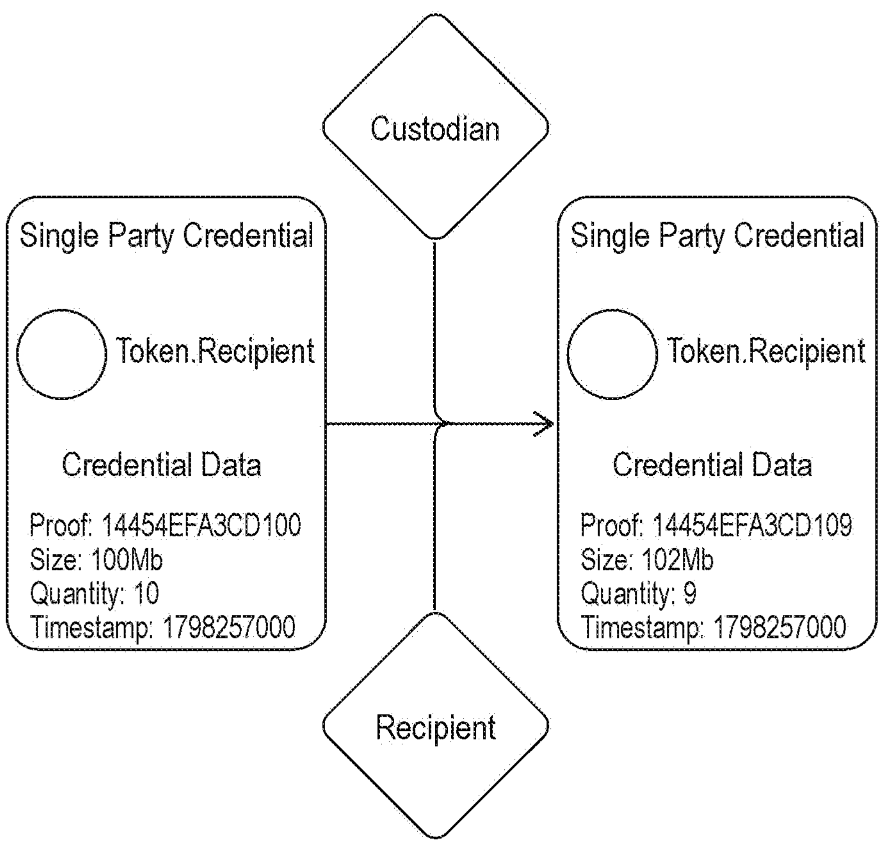
FIG. 6 is a schematic view of an embodiment of the invention.

Single Party Credentials: According to an embodiment, shown in FIGS. 4-6, credentials can be created for a single party to issue permissions to anything, whereby the individual credential is specific to the party, and datasets can be added to the credential to grant access rights.

Dataset Credentials: According to another embodiment, shown in FIG. 7, credentials can be created for a specific dataset and permissions are added and removed for different parties over time.

Data Owner Credentials: According to another embodiment, shown in FIG. 8, a party's data can be represented by a credential and the data is stored by a third party who only shares the according to the token permissions.

Figure 9:
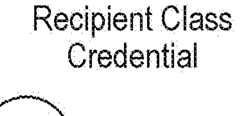
FIG. 9 is a schematic view of an embodiment of the invention.
Figure 10:
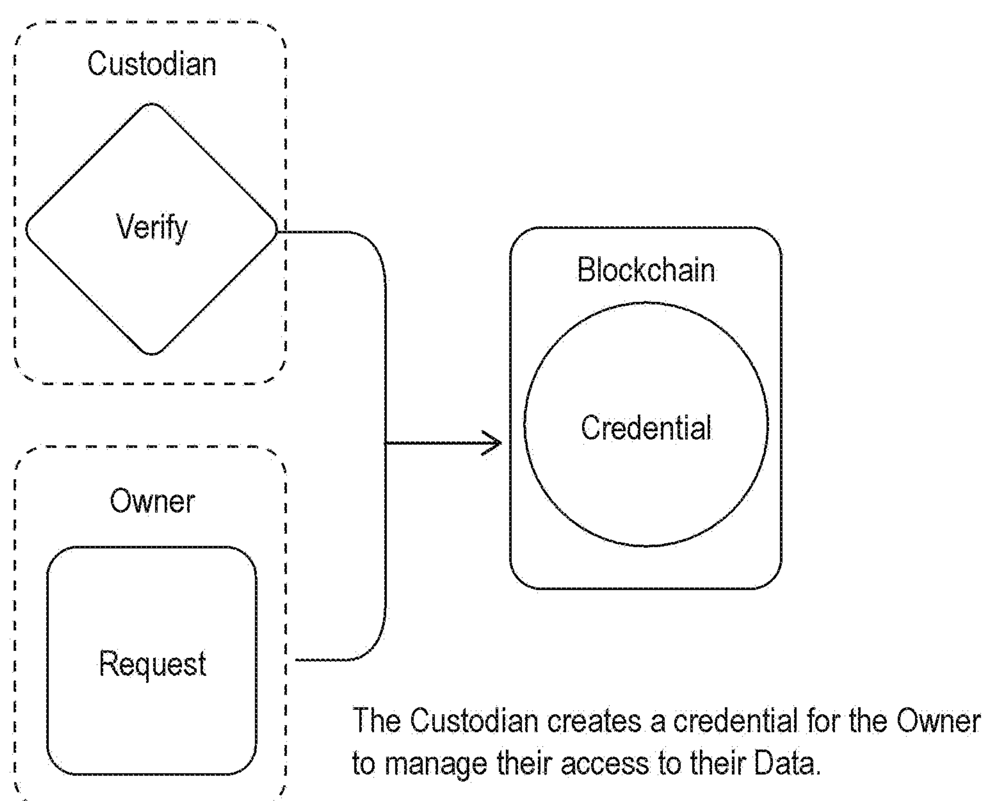
FIG. 10 is a schematic view of an embodiment of the invention.
Figure 11:
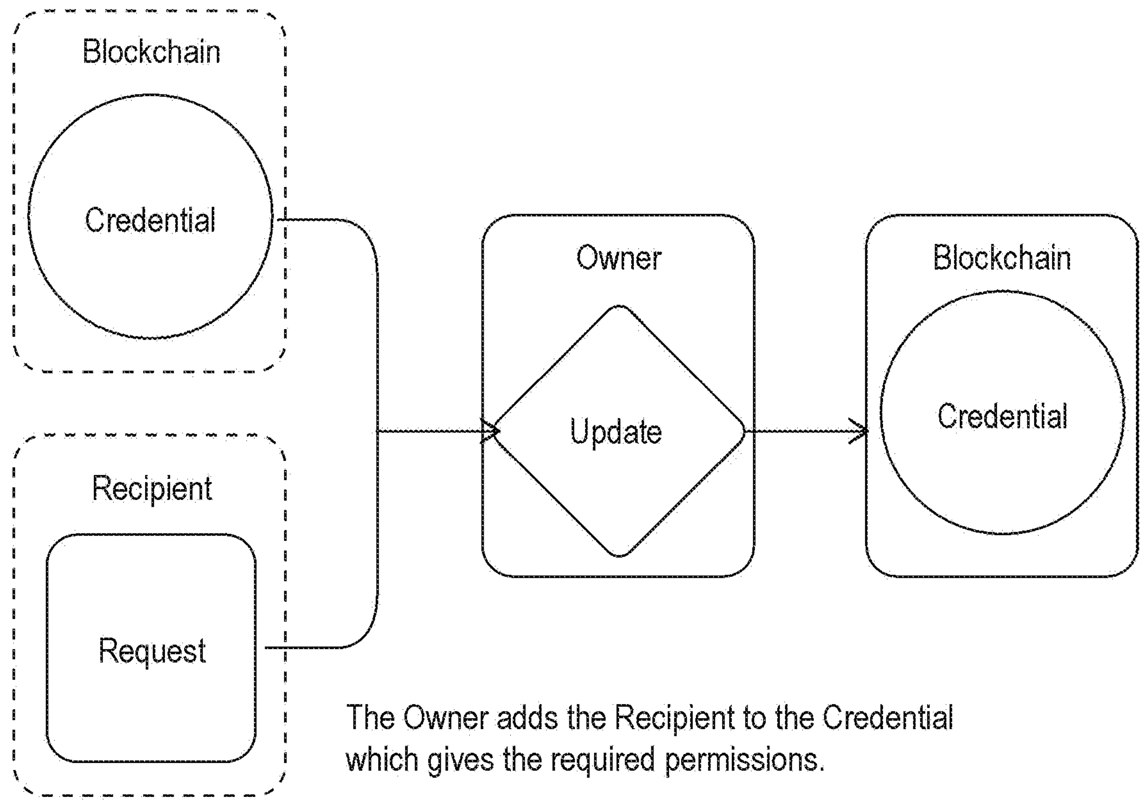
FIG. 11 is a schematic view of an embodiment of the invention.
Figure 12:
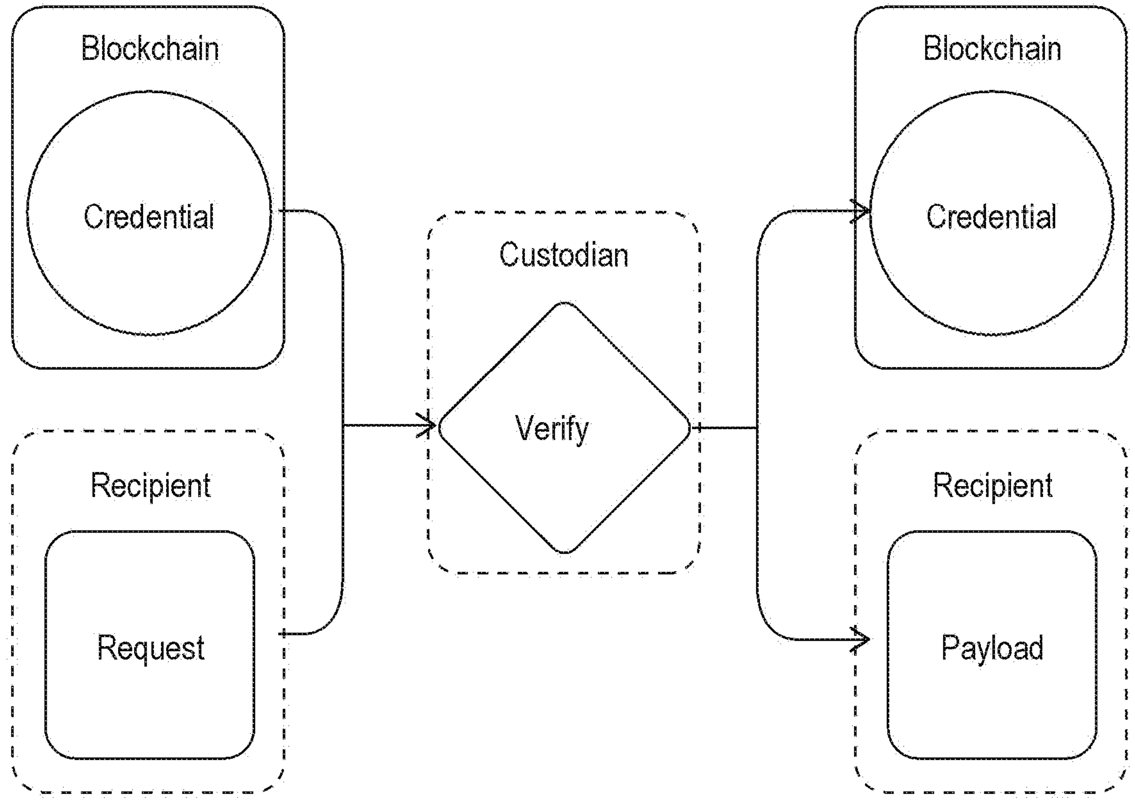
FIG. 12 is a schematic view of an embodiment of the invention.
Figure 13:
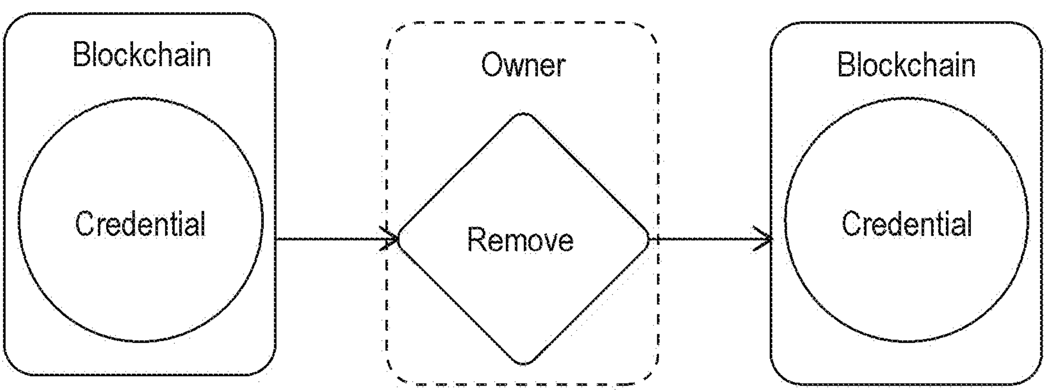
FIG. 13 is a schematic view of an embodiment of the invention.

Recipient Class Credential: According to another embodiment, shown in FIG. 9, the credential is used to manage data according to the recipient, rather than the owner.

Metadata: The information that is stored on or about a credential allows for implementation of different rules for distribution of the dataset. Proof of a dataset can be a hash or a proof generated about the dataset that can be used to compare the data received (or shared) to the intended dataset. This provides a verifiable layer of security about the dataset to prevent mismanagement of data.

Various kinds of limitations can be put on a credential to enable various permissions. Such limitations can include: deadlines/expirations, timestamps, quantities (number of instances of access), frequency of access (e.g., once, twice, etc. per day, per month, etc.). Access to data can be limited to a certain maximum number of times, or up to a certain date. A timestamp can be recorded each time data is accessed.

In another example, a party can be allowed to access the data at certain time intervals, such as once per hour.

Example interval limitation of access:

proof: <someHash>,

Party: <someCredential>,

Interval: 3600000, (1 hour)

Timestamp: 1734517400000, (issuance timestamp to calculate against)

Count:

In another example, a party can be allowed to access the data up to ten times.

Example metadata:

ownerToken proof: <someHash>, party: <someCredential> quantity: 10 timestamp: 1723498738000

In this example, the token is managing access to a dataset by an owner. As shown in FIGS. 10-13. The dataset can be hosted by a third party provider. The party who requests the information shares a proof of themselves, such as a wallet credential, platform user id, or other suitable means of proof. The user adds that proof to the token under the "party" field to give them access to the dataset, verifiable by the "proof" attached to the token. The party can then sign a transaction to update the token to prove that they can access the dataset, the system decrements the quantity to nine, and the timestamp is updated to show when the data is received.

The system can be used with public or private blockchain platforms. According to an embodiment, the system can be adapted for use on the CARDANO blockchain platform. According to another embodiment, the system can be adapted for use on the HYDRA blockchain platform. Alternatively, the system can be used on a new blockchain platform built specifically for the system.

The system uses "dynamic credentials" which allows for greater flexibility and workflows that are highly dynamic, configurable, and upgradable. Blockchain credentials can be fixed either in single use or purpose. This allows for dynamic and multi-purpose credentials to be created and managed according to needs, while also benefiting from the immutability of the blockchain and the use of smart contracts to provide security and trust.

Credentials can be deployed on any private or public blockchain, layer 1 or otherwise, as well as sidechain, partner-chain or rollup to allow for many different levels of privacy according to the requirements of the system, without changing the fundamental design of the dynamic credentials or the ways in which they are managed/updated. The system can be used with various blockchain platform. The specific blockchain platform does not change the design of the system beyond adapting to the inherent rules of the specific blockchain it is built on (costs for transactions, metadata storage, etc.).

According to an embodiment of the invention, the system can be automated, self-hosted, or managed by any or all of the individual parties. The fundamental dynamic credentials and validation do not change, just the roles that any given party plays in the verification of permissions of credentials in the system.

According to an embodiment, the system can utilize automated and/or manual processes. The difference between automated and manual processes is who/what is issuing credentials, who is managing signing transactions and who is validating the proofs. It is a difference in how the system is applied for that specific implementation.

The system according to embodiments of the invention provides significant benefits and/or advantages over non-blockchain based credential systems. For example, physical credentials, such as cards, can be cloned or stolen, while the credentials of the system according to embodiments of the invention can only be created onchain in accordance with the specific rules set by the implemented system, which can be varied depending on different needs of different applications. Standard cryptographic credentials can be cloned from a central database, leaked or simply recreated, such as a webtoken. This cannot happen in the system according to embodiments of the present invention, which is onchain. Typical access logs can be deleted, edited or never even recorded. By utilizing blockchain technology, all interactions with the system are recorded and immutable, so a full history of a credential will always be available and cannot be edited. The system is predicated on tamper-proof blockchain technology, resulting in improved security, and flexibility to be deployed according to the needs and specifications of the particular application in which the system is used.

According to an embodiment of the invention, the system can be a three-party system. The system can include the roles of Owner, Custodian and Recipient. Token credentials can represent an individual or party. The datum can include the dataset proof and any other information that may be needed for the particular application in which the system is to be used.

In an embodiment, the credential represents an individual party. The Custodian is sharing the data on behalf of the Owner, so they issue a credential Token for the Recipient.

The asset can be built as follows: PolicyId(Owner).AssetName(Recipient)

The above is one token representing an Owner's dataset, which has been issued specifically for the Recipient. The credential can be issued either by the Owner directly or by the Custodian on behalf of the Owner, and information about the dataset can be added:

```
TokenDatum {
  dataset: <someHashOfData>,
  size: <sizeOfDataset>,
  deadline: 1798257429000
}
```

In the above example, the Recipient has a deadline to access the dataset before the credential is unusable. This is different from being revoked as the credential still exists. If the Recipient misses the deadline or they need to request a different dataset, the TokenDatum can be updated accordingly. When they receive the dataset they can verify it by comparing the size and the dataset proof against what they received. Any party could audit this interaction as it is recorded on the blockchain. They would be able to verify the dataset (as a party involved) to the proof supplied in the transaction at the TokenDatum, or to validate the information exchange as an external auditing party, such as an attorney or accountant. The dataset can also be issued on a different credential to an external auditing party (such as a lawyer) and their dataset will match their own credential's dataset proof and the original Recipient credential. This can be useful for multi-credential issuance as it allows for proof verifications.

In another embodiment, a token can represent a dataset and the datum can contain the proof and any parties with access permission. In this example, data can be aggregated for a specific User automatically. This can be helpful for a perpetual or continual access token, issued as part of verification for third party vendors. For example, a particular dataset that applies to all users of a web application. The tokens represent specific datapoints such as Age of Users. Although the data relates to the user, the data is held by the platform as it is anonymous data collected by the platform. As such, the user does not need to verify themself as the Owner. Instead, the Owner and Custodian roles are filled by the platform. Data can be collected on the platform and made available through an aggregated Application Programming Interface (API) endpoint:

```
PolicyId(Custodian).AssetName(Dataset)
Token Datum {
  dataset: <someProof>,
  class: <somePrivacyClass>,
  size: <inMb>,
  timestamp: <posixTimeOfUpdate>,
}
```

In the above example, the token itself only represents the specific dataset (Age) of platform users, which can be described as the Age Credential. Third party vendors and researchers can subscribe or perform a single snapshot request of this dataset. The dataset is updated as more data is collected or users are removed from the platform (according to data privacy laws for example). At the same time, the other metadata will be updated such as the timestamp. The "class" field represents the level of privacy, or level of third-party vendor membership required to access this dataset.

In another embodiment, tokens can represent an owner of the data, and the metadata can hold proofs of the dataset and party(s) who have permission to access the data. A credential is issued based on the Owner. The credential can be issued by the Custodian when a user creates an account with them. The user is the Owner of the data, and the Custodian is the collector and manager of that data.

The asset is built as follows:

```
PolicyId(Custodian).AssetName(Owner)
Token Datum {
  dataset: <someHashOfData>,
  size: <sizeOfDataset>,
  recipient: <someRecipientCredential>,
  timestamp: <somePosixTime>,
}
```

This can be a one-time data access request, or it can be a continuing request which grants a Recipient access to the dataset on a contractual or perpetual basis. Because the Custodian/Owner relationship is fixed, it is preferable to use as a one-time token.

When the Recipient receives the dataset, they can compare the tokenDatum and update. The Custodian can automatically update the timestamp for when the access request was delivered. When the dataset is updated or when a new dataset is created, the entire TokenDatum can update and the Recipient can be removed. Because there is a transaction present onchain, the record of this data sharing is easily accessible and replicable for an external auditing party.

According to an embodiment, the system includes four separate roles. This is useful when individual parties work to fulfil each role as a service or on behalf of smaller departments within a company. For example, a government agency may have an individual service to execute each of the roles in aggregate. The four roles can be Issuer, Verifier, Custodian, and Owner. The Issuer role is filled on a per-agency basis for the government, who issues all credentials for the particular agency. The Verifier role can be filled at a specific site, verifying credentials for all departments. The Custodian role can be filled by the department themselves, managing the data/credentials for the department. The Owner role represents the individual to whom the credential belongs.

According to another embodiment, this four-role system can also be used in a corporate conglomerate entity that manages several distinct businesses. In this embodiment, the Issuer is the party that issues credentials for a particular business. The Verifier is the specific business or service that manages verification. The Custodian is the corporate conglomerate entity that manages all of the businesses. The Owner is the individual that the credential represents.

According to another embodiment, the Issuer is a business or service that generates credentials for businesses or applications. The Verifier is an automated service that verifies credentials. The Custodian is the business or company that manages data and credentials. The Owner is a company that uses the above service(s) to manage their data for them.

The system does not use a multi factor authentication mechanism, and does not require storing multiple datapoints on the blockchain. The system does not record a user's device, or require a credential for one or more devices. The system does not store multiple data points on the user or recipient of a request. The system can use a credential to store a record of times someone accessed, what access permission they have and who/what/where the data is or belongs. The system's credentials describe a relationship between two or more parties in how they are created and what metadata they have and the token identifier.

The system can be used in a variety of practical applications. An embodiment of the invention comprises a global use system that can be used in any industry in which system access and/or sharing of data across business partners is needed or required. According to an embodiment, this global use system, which is industry agnostic, can be used to share data across third party data vendors. According to the global use system embodiment, token credentials are issued for each vendor. Credentials are assigned access to certain data (private, general, etc.). Data is collected by the platform about users and organized according to privacy level. Vendors can access data according to their credential. When a vendor changes the data that they require, the credential permissions are updated. When the business no longer works with the vendor, the vendor's credentials are revoked.

In another embodiment, the global use system can be used to provide company premises access. In this embodiment, token credentials are issued per each employee of a company. The credentials store the areas of access permitted for each employee. Access to permitted areas is granted, and access to non-permitted areas is denied. When an employee's access changes, the credential is updated to reflect the new areas of access for the employee. When an employee leaves the company, the employee's credentials are revoked. The revocation can be automatic upon revocation of the employee's Active Directory ID.

Another embodiment of the invention comprises a health data sharing system for use in the healthcare industry. The system can be used to share data with a third party, such as an independent affiliated healthcare provider, a tech vendor, services vendor, payor and/or patient. Large consolidated healthcare companies comprised of many different healthcare providers stretching across a geographic region have become common in the United States. Many such healthcare companies have tens of thousands of contracted third parties providing labor and/or technical support services to providers of the company. This requires third party access to sensitive healthcare data, which introduces enormous risks to the healthcare company. A breach of cybersecurity resulting in an unauthorized leak of healthcare data can result in substantial adverse legal and financial consequences for the healthcare company. In addition, there is a significant increase in the amount of field tech support that is being staffed outside of the United States in an effort to reduce labor costs to healthcare providers, which presents cybersecurity risks and challenges. The health data sharing system embodiment of the present invention provides a secured means for sharing data in today's healthcare industry. The health data sharing system can be used by a patient to exercise personal control over his/her medical data.

The following is a description of a health data sharing system and use thereof according to an embodiment of the invention. A hospital stores data about a patient, which needs to be shared with a third-party payor, such as the patient's insurance company. A tokenized credential is issued and stored on a blockchain platform. The patient data is stored outside of the blockchain platform. For example, the patient data can be stored in the hospital's internal database that complies with HIPAA regulations. The patient adds the insurance company (payor) to the tokenized credential. The insurance company (payor) requests data from the hospital using the credential. The hospital shares the patient data and attaches a hash to the credential so all parties can verify it. Once the insurance company (payor) has received the data, the credential is revoked. The hash can index the type of data to access. The system includes appropriate hash mapping that points to the correct data set. The health data sharing system provides a verification layer that protects against unauthorized access to personal healthcare data. The health data sharing system can serve as a gatekeeper to verify, grant and term access to any healthcare provider data.

In another example of using the health data sharing system, a hospital needs to share medical records of a patient, such as cardiovascular images, with a third-party contracted group of medical specialists, such as a radiology practice. The hospital adds the radiologist who is to read the images to a credential token. The radiologist requests data (cardiovascular images) from the hospital using the credential. The hospital shares the data (images) and attaches a hash to the credential so that all parties of the patient's care team, such as radiologist, cardiologist, and primary care physician, can review the images. Once the images have been received by the third party group, the credential is revoked.

Another embodiment of the invention comprises a system for sharing restricted government data. The system can be used by local, state and federal government agencies. For example, a government agency has a report to which access is to be restricted to individuals having certain clearances. Permission to access the report is attached to each individual employee's credential having clearance to access the report. The employee can use the credential to access the report for a certain time (such as when they are assigned to a specific project). Employees who are not assigned to the project is able to access the report with their credential.

Another embodiment of the invention comprises a system for use by financial institutions, such as banking and lending institutions. For example, a bank seeks financial data from an individual applying for a loan from the bank. The loan applicant wants to allow certain access to sensitive financial data in order to be considered for the loan. Permission is attached to the employee credential of the bank employee reviewing the application of the loan applicant. The bank employee can use the credential to access the loan applicant's data for a predetermined period of time. Once the predetermined period of time is expired, the credential is revoked.

Another embodiment of the invention comprises a system for use by academic institutions. Academic institutions, such as schools and universities, often receive requests to share a student's academic record with a third-party entity, such as a potential employer or another academic institution, when the student is applying for employment or admission to another academic institution. The system can be used to share academic records with a third-party entity for a window of time during the hiring/application process to allow the third-party entity to verify the student's grades without sharing other private data about the student. The student can attach the entity's details to a credential for a one-time validation of the grades, and then the entity would be automatically removed from the credential.

Figure 14:
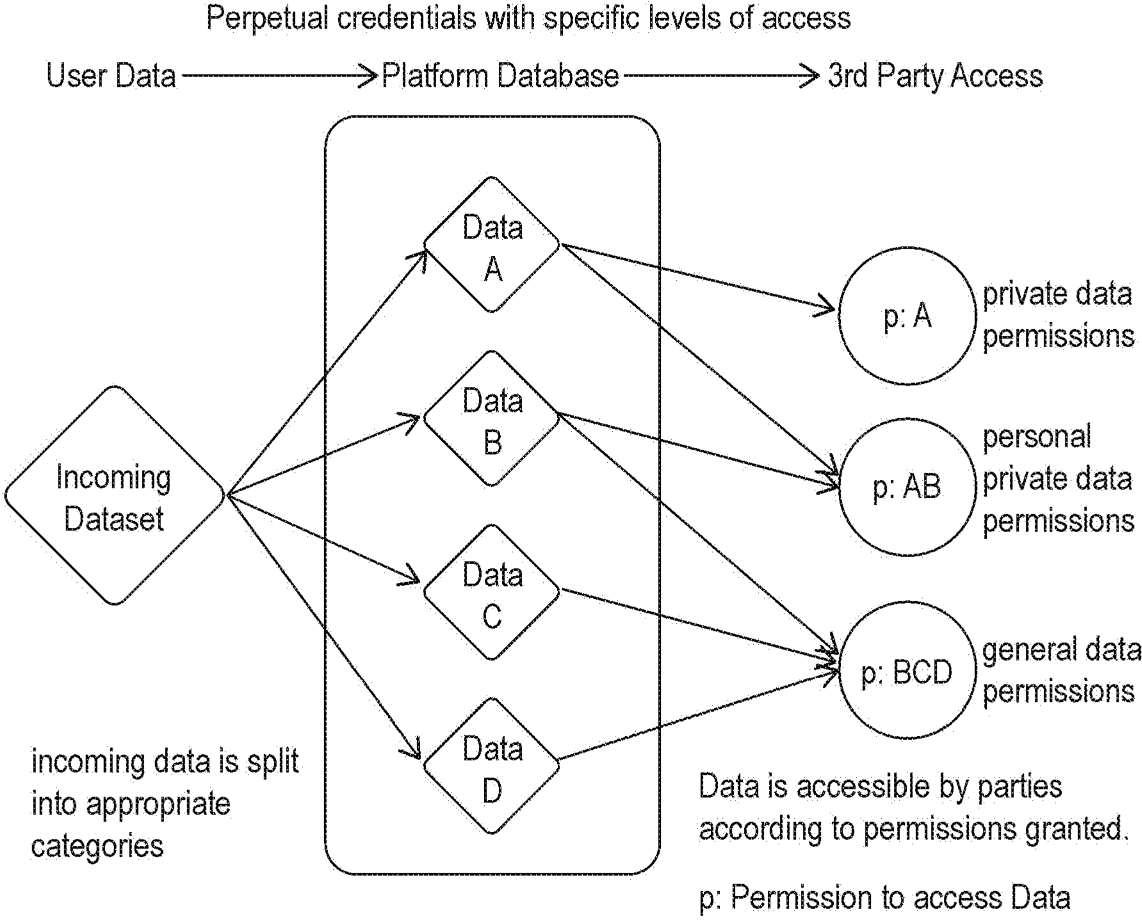
FIG. 14 is a schematic view of an embodiment of the invention.
Figure 15:
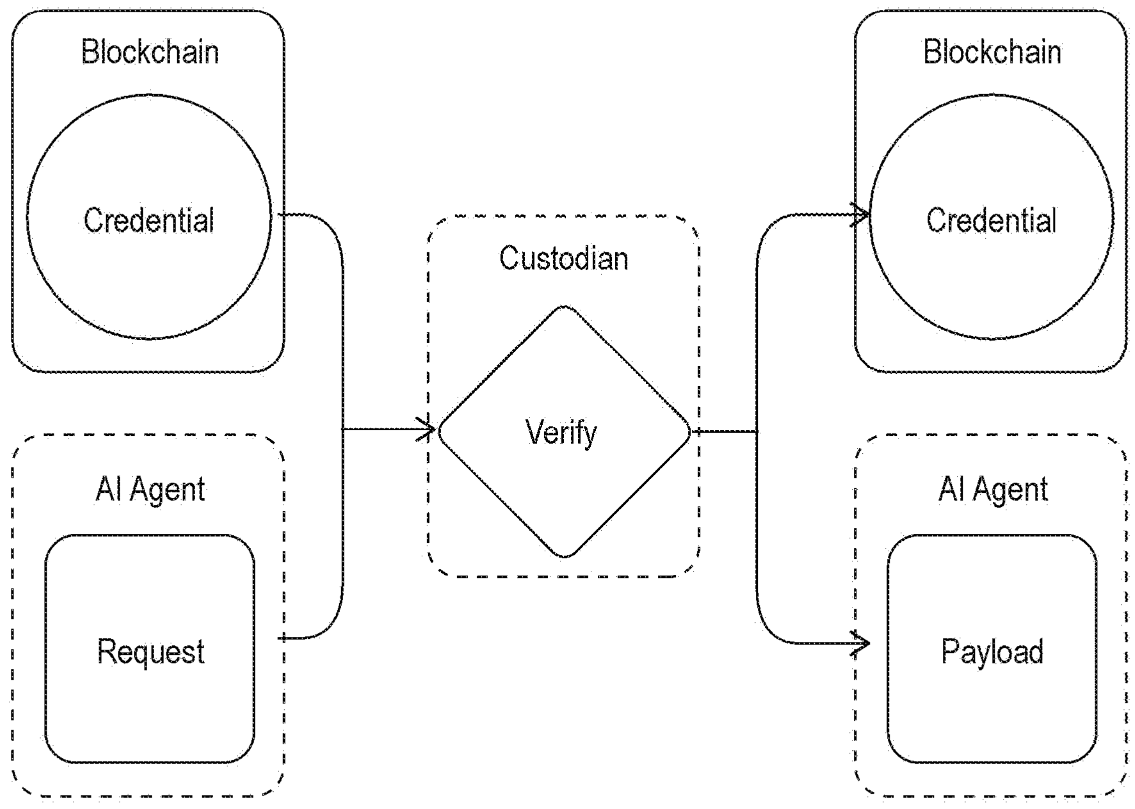
FIG. 15 is a schematic view of an embodiment of the invention.
Figure 16:
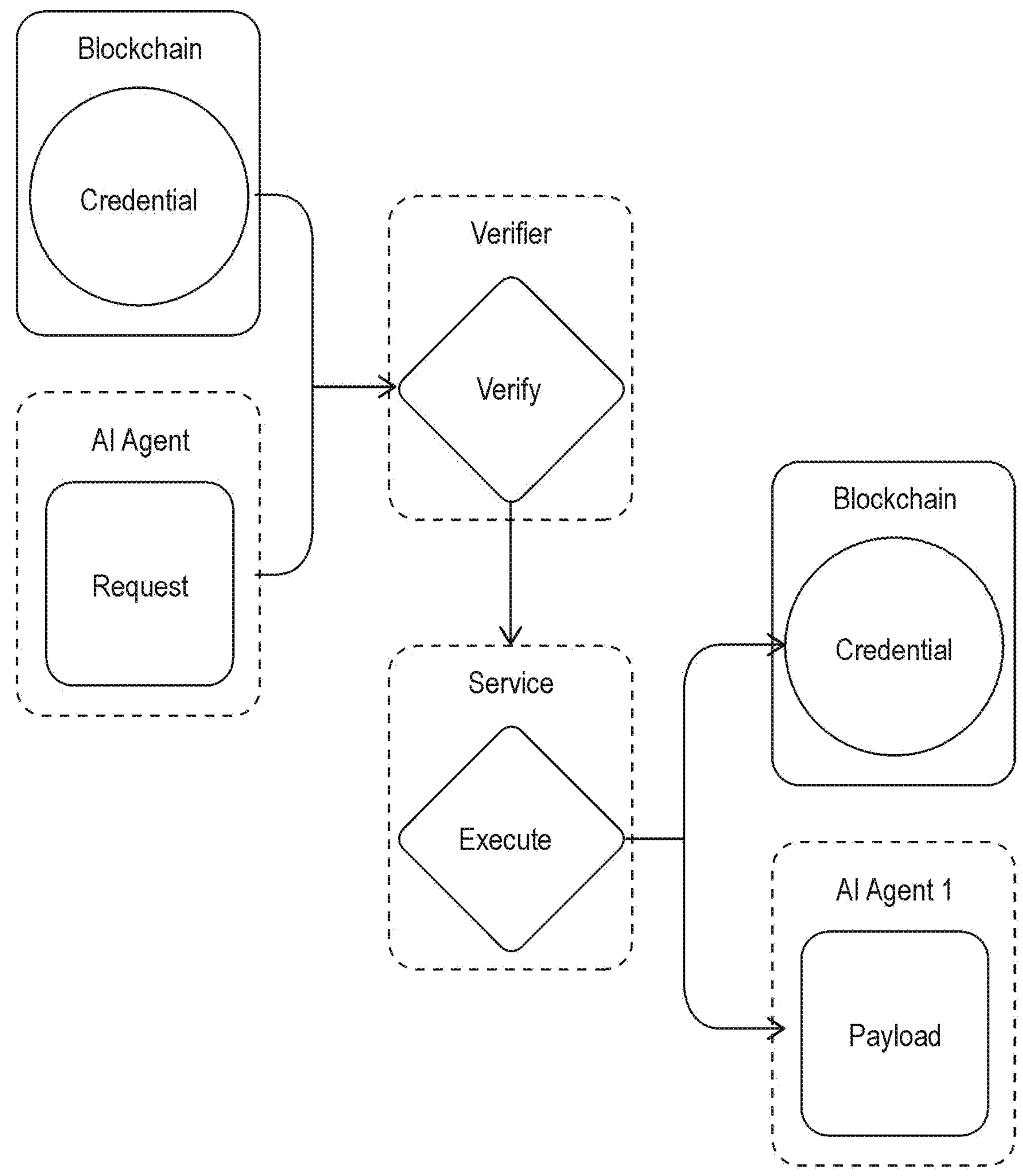
FIG. 16 is a schematic view of an embodiment of the invention.

Another embodiment of the invention comprises a system for use in the airline industry. A great deal of personal and private data is required for international flights. The system can be used for quick verification of passengers that would allow for discrete verification and validation of passengers. There can be various levels of access, allowing different data to be accessed by different entities, as shown in FIG. 14. This can include biometric data or similar data that can be verified at the passport control office at international airports and destinations. A select snapshot of a passenger's data can be attached to a credential that can be used to verify the person holding the ticket at the gate. Likewise at passport control, when an emergency is occurring at the airport and a record of everyone on a flight is needed quickly. Less private data can be shared with a hotel. Just a passenger's name and arrival time could be shared with a shuttle or taxi service. Anonymous data can be shared with third parties according to the permissions set by the passenger, and can be done so on an individual basis. The limitations and the actual shared data would all be verifiable, time stamped and tracked onchain, and if anything occurs without permission it would be easily auditable.

According to an embodiment of the invention, shown in FIGS. 15-18, the system utilizes artificial intelligence (AI). An AI agent can be used to fulfil the role of any of the parties of the system and/or can act on behalf of any of the parties. For example, an AI agent can act on behalf of the recipient of data and/or the custodian of data.

According to an embodiment, risks associated with the use of AI can be minimized by narrowing the scope of data that AI can be accessed by an AI agent, and prevents the AI agent from accessing wrong information.

The system can enable the user to control the degree or extent of communication, interaction and/or activities that is allowed between AI agents, such as large language models (LLM) and other AI services. The system uses credential access that can allow and verify the AI agent should have access to data and when and how the AI agent can access data. For example, a credential can be created that permits an AI agent to spend funds in alignment with specified rules, such as a spending limit of $100.

According to another embodiment, the system is used in healthcare. For example, a hospital has a server ingesting radiology data, but this server has an AI agent configured to allow access to data. By adding parameters via dynamic credentials, a guardrail can be built around this access. The parameters can limit what the AI agent is and is not able to do, such as accessing information, limiting certain actions the AI agent can take with the data, and/or limiting the time period the AI agent can access the data.

Additional healthcare AI agent applications, in which the system can be used include: introducing parameters to ensure the highest quality project ideas are championed or adopted (Project Management Office), introducing credentials when AI agents are involved with claims and coding workflows, nurse scheduling, patient navigation agents and supply chain and strategic sourcing services. AI agents are increasing in demand and usage across industries to help identify best purchasing strategies, contracting tactics and negotiating greater efficiencies with purchasing and resource staffing. There are reported cases of AI agents outperforming human physicians. The system credentials can allow patients to share relevant medical data without revealing personal or private data to the AI agent. This credentialing tool helps make data sharing more secure and safe for users without the need to trust AI will act appropriately and access only approved data.

Figure 17:
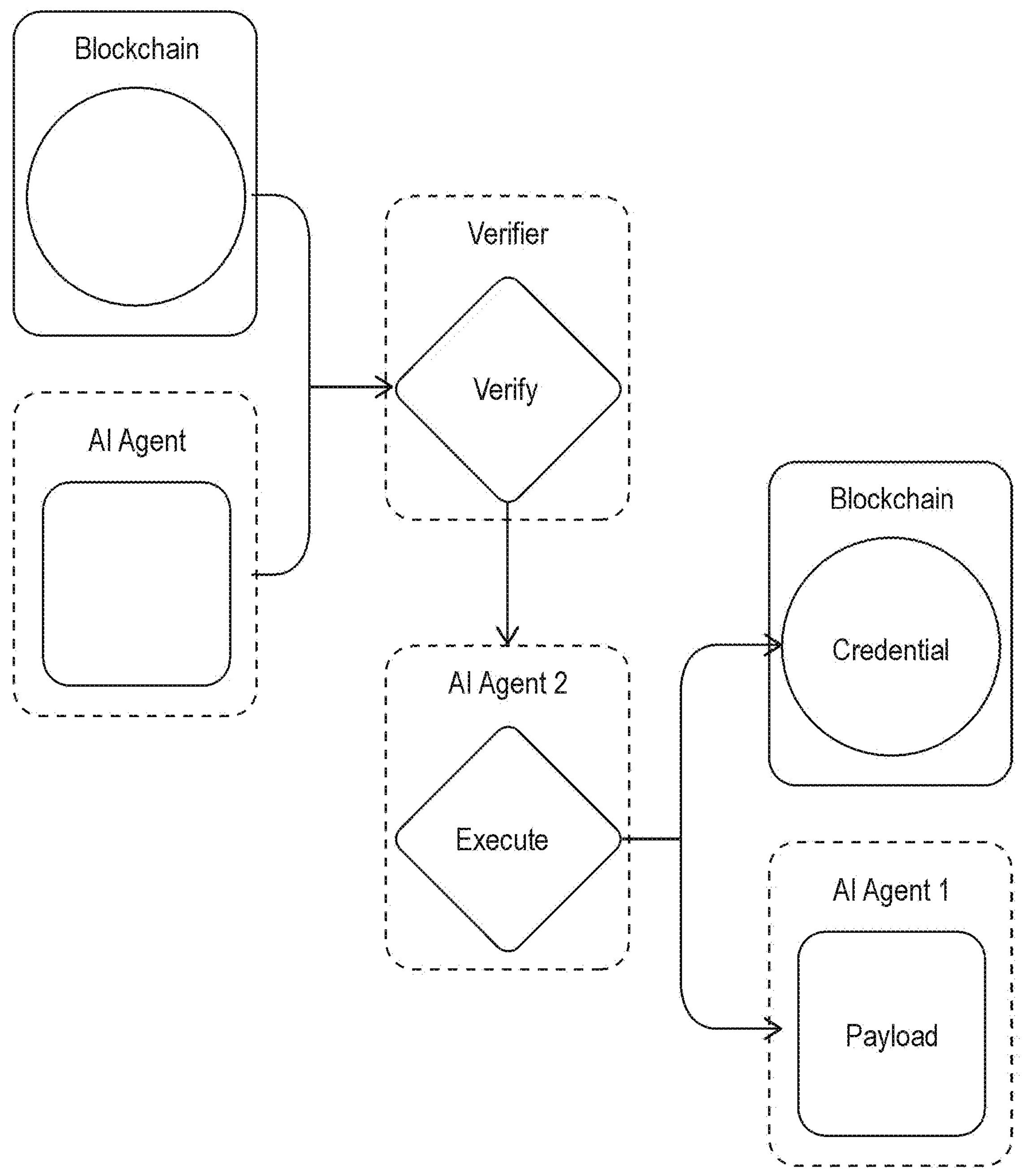
FIG. 17 is a schematic view of an embodiment of the invention.

According to an embodiment, shown in FIG. 17, multiple AI agents with credentials allowing the AI agents to communicate with each other according to rules specified by the credentials, such as granting and revoking access to the AI agents based on how well the AI agents have been performing.

AI and LLM are in widespread use today across all industries on a global scale, monitoring many aspects of our lives and using personal information in a variety of ways. The system's dynamic credentialing can allow a user to set permissions and parameters for an AI agent, specifying what personal data the AI agent is able to access, such as type of information, date ranges, sources of information. Also, the parameters of the dynamic credentialing can permit the AI agent to access certain types of personal information while prohibiting access to other types of personal data. Also, the dynamic credentialing can permit the AI agent to access certain personal information only if the user is provided a specified financial compensation for access to the personal information. The system can create an auditable trail to see whether data has been used and empower the user to refine, grant, and/or revoke permissions to further train the AI agent. The dynamic credentialing is applicable with AI agent/LLM workflows across all industries, including but not limited to healthcare, banking, legal, government, oil/gas/energy, aerospace, airline, engineering, science and mathematics.

An embodiment of the invention provides agent to agent functionality. According to this embodiment, the dynamic credentialing system can be used not only through human end user interaction with AI agents or third parties, but also configured to manage and control parameters with which agents are able to interact and share data between agents (agent to agent) in an agentic framework. The dynamic credentialing system can be utilized in data access, permissioning and provisioning of access and roles, accomplished by security methodologies including, but not limited to, roles based access controls (RBAC). Credential logic can be built around predefined user specific information or categories that group agents and third parties according to function and data needed. The system can be utilized in designing operational policies specifying the data access rules logic across all entities accessing data and/or exchanging information and interacting across an organization ecosystem: human user to human user, human user to AI agent, or in the scenario of agentic framework: AI agent to AI agent (involving one or multiple agents). The system can be used in harnessing dynamic credentialing data and metrics to inform an AI agent or external entity "Data Access Performance Dashboard" which can look at overall agent performance regarding compliance, agent latency, and adherence to rules configured.

The dynamic credentialing system according to an embodiment of the invention can be utilized in an agentic framework. For example, three types of AI agents—a Data Collection Agent, Decision Making Agent and Execution Agent—can interact across industries. The Data Collection Agent can gather, monitor, and aggregate information from various sources in real-time or on scheduled intervals. The Data Collection Agent can scrape websites, monitor APIs, collect sensor data, track social media mentions, and/or pull data from databases and external systems. The Decision-Making Agent can analyze information, apply business rules or machine learning models, and make automated decisions based on predefined criteria. The Decision-Making Agent can evaluate options, calculate risk assessments, approve or reject requests, and/or trigger specific actions based on their analysis. The Execution Agent can carry out tasks and implement decisions by interacting with systems, users, or external services, and can send notifications, update databases, place orders, schedule appointments, and/or perform any operational tasks that require action.

The dynamic credentialing technology according to an embodiment of the invention can ensure that agents across industries function reasonably across agents (agentic framework). Scenario logic can be configured that specifies appropriate use cases and data exchange, and not allow a data collection agent to jump directly to an execution agent, if there are specific rules or conditions that need to be satisfied with the decision making agent first, before making execution.

According to an embodiment, the system can be used in e-commerce fraud detection. A Data Collection Agent can continuously monitor transaction patterns and customer behavior. When it detects unusual activity, it conveys this information to a Decision-Making Agent that can run fraud detection algorithms. If the Decision-Making Agent flags a transaction as potentially fraudulent, it signals an Execution Agent to temporarily freeze the account and send alerts to both the customer and fraud team.

According to another embodiment, the system can be used in supply chain management. A Data Collection Agent can track inventory levels, supplier performance, and demand forecasts. When inventory drops below thresholds, a Decision-Making Agent evaluates supplier options, pricing, and delivery times to determine optimal reorder quantities and suppliers. The Execution Agent then automatically places purchase orders and updates inventory management systems.

According to another embodiment, the system can be used in customer service automation. A Data Collection Agent can monitor incoming support tickets and customer sentiment. The Data Collection Agent feeds this information to a Decision-Making Agent that categorizes issues by urgency and routes them appropriately. Based on the decision, an Execution Agent can either provide automated responses for simple queries or escalate complex issues to human agents while updating ticket status and sending acknowledgments to customers.

Examples of types of agents in a healthcare provider setting, in which the dynamic credentialing system according to an embodiment can be used, include an agentic framework encompassing the following: a Patient Scheduling Agent, Patient Clinical Agent, and Patient Billing Agent. In this embodiment, the system can manage appointment booking, cancellations, and rescheduling across multiple providers and departments, and monitors provider availability, patient preferences, and scheduling constraints. The Patient Scheduling Agent handles waitlist management, sends appointment reminders, and optimizes schedule efficiency by identifying gaps and suggesting optimal time slots. The Patient Clinical Agent tracks patient medical history, current treatments, and care plans, monitors clinical protocols, drug interactions, and treatment guidelines, manages care coordination between specialists, tracks test results and follow-up requirements, and ensures clinical workflows are followed appropriately. The Patient Billing Agent processes insurance verification, generates claims, tracks payments, manages billing workflows, monitors outstanding balances, handles payment plans, ensures compliance with billing regulations, and manages prior authorizations and coordinates with insurance providers for coverage determinations.

Examples of agent interactions in which the system can be used include pre-visit preparation, treatment authorization workflow, and care coordination. In pre-visit preparation, the Scheduling Agent books an appointment and shares patient ID and appointment details with the Clinical Agent, which then reviews the patient's medical history and flags for any required pre-visit preparations (lab work, medication reviews). The Clinical Agent notifies the Billing Agent to verify insurance coverage for planned procedures, ensuring financial clearance before the visit. In treatment authorization workflow, the Clinical Agent identifies that a patient needs a specialized procedure and shares treatment codes and medically necessary documentation with the Billing Agent for prior authorization. Once approved, the Billing Agent notifies the Scheduling Agent with coverage details, allowing scheduling of the authorized procedure with appropriate time allocation. In care coordination, when a primary care visit results in a specialist referral, the Clinical Agent shares relevant medical history and referral requirements with the Scheduling Agent to book the specialist appointment. The Billing Agent receives the referral information to process any required authorizations and ensure the specialist visit is covered under the patient's insurance plan.

Figure 19:
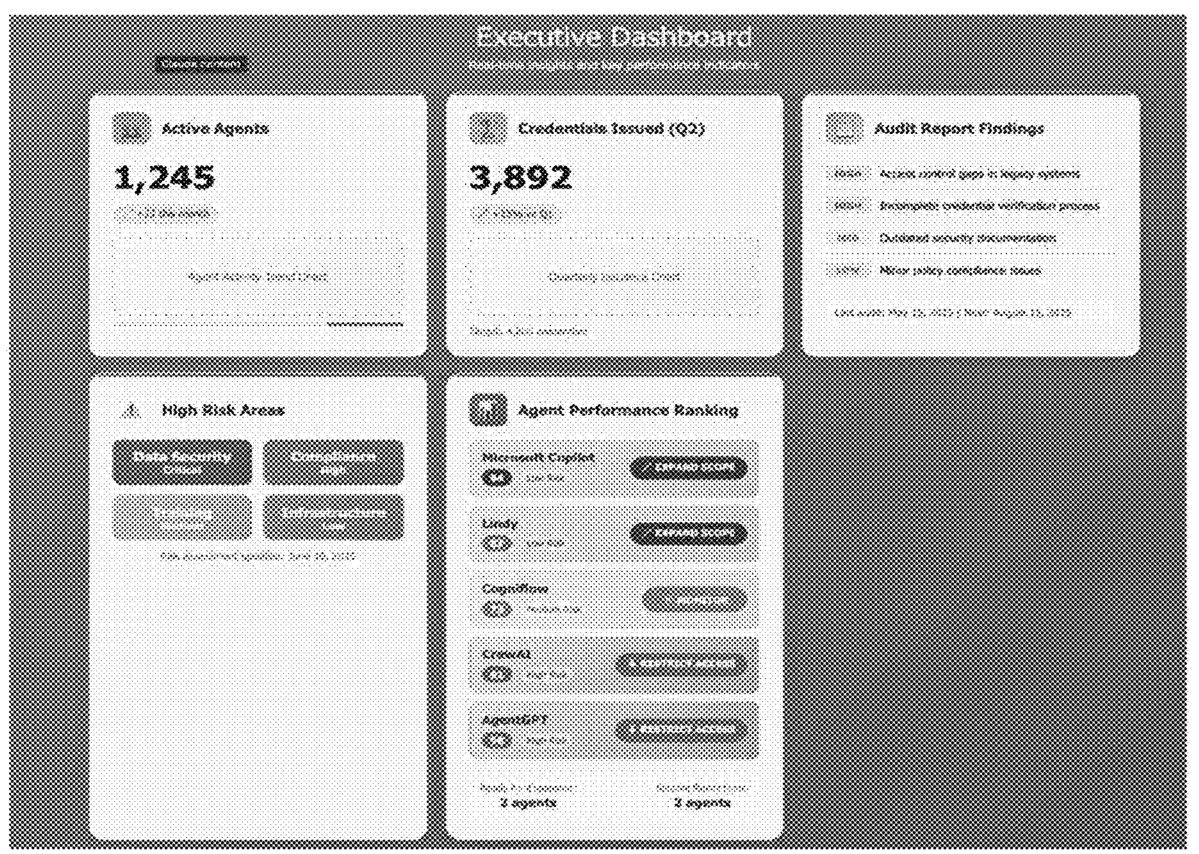
FIG. 19 is a schematic view of a system dashboard according to an embodiment of the invention.

According to an embodiment of the invention, an agent performance dashboard can be provided, such as the executive dashboard illustrated in FIG. 19. Key performance indicators can be configured via the system and derived on system performance, analytics and output. The key performance indicators can be customized based on client need, industry need and/or use case. Real-time alerts can be configured and customizable based on agentic landscape and areas of vulnerability and risk. Client-specific data access and provisioning policies can be provided.

In another embodiment, the system can be used in banking financial transactions. A credential is created that permits an AI agent to spend funds on behalf of a human user in alignment with specified rules, such as a $1000 spending limit. For example, "open AI platform, go book this, or purchase this within financial or conditional constraints set forth by human user via credential."

According to an embodiment, the system is used in healthcare. For example, a hospital has a server ingesting patient data from numerous technical servers. The AI agent is configured to access patient data in order for the AI agent to aid in diagnosing and treating patents. The human user configures conditional parameters via blockchain dynamic credentials that provides a guardrail around what the AI agent can access. The blockchain dynamic credentials can control what the AI agent/LLM is able to do with the patient data obtained from the health record and/or any boundary systems that are integrated with the health record software, such as medication dispensing technologies, lab, imaging, cardiology, revenue cycle, claim management software technologies, among others in the healthcare ecosystem of providers and payors. The blockchain dynamic credentials can limit the AI agent's access to a predefined scope of data set information, can limit certain actions the AI agent can take with the server data, and limit the time period the AI agent can access the server data with a full auditability trail. All of the dynamic credentials can be fluid and iterative and revised by the user as conditions and workflows change.

The system can be used by a variety of applications, including cloud infrastructure and hosting services, cybersecurity and data protection, business intelligence and analytics, customer relationship management (CRM), enterprise resource planning (ERP), human resources and payroll management, financial management and accounting, supply chain and procurement management, document management and collaboration tools, communication and unified messaging platforms backup and disaster recovery services, identity and access management (IAM), API management and integration platforms, quality assurance and testing services, and training and learning management systems.

An embodiment of the invention comprises a non-transitory computer readable storage medium adapted for managing the distribution of data on a blockchain. Another embodiment of the invention comprises a general-purpose computer that has been programmed to perform particular functions as a specific purpose computer for managing the distribution of data on a blockchain.

An embodiment of the invention comprises a server and a non-transitory computer readable storage medium comprising software having programming instructions that, when executed, cause the server to perform any of the systems described above.

Another embodiment of the invention comprises a computer hardware processor and a non-transitory computer readable storage medium comprising software having programming instructions that, when executed, cause the computer processor to carry out the systems described above.

Another embodiment of the invention comprises a general-purpose computer that has been programmed to perform particular functions as a specific purpose computer pursuant to the instruction from program software, such as the software described above.

A system for managing distribution of data using a blockchain is described above. Various changes can be made to the invention without departing from its scope. The above description of various embodiments of the invention are provided for the purpose of illustration only and not limitation—the invention being defined by the claims and equivalents thereof.

What is claimed is:

1. A computerized method for managing distribution of data, comprising:

initiating, on behalf of a first party, a request for data to a second party having custody of the data;

minting a tokenized credential on a blockchain platform, wherein the tokenized credential comprises metadata defining limitations that control access by the first party to the data;

storing the data external to the blockchain platform;

receiving, from the first party, a proof of identity of the first party for validation against the tokenized credential;

allowing the first party to access the data represented by the tokenized credential in response to the proof of identity of the first party; and after issuing the tokenized credential via the minting on the blockchain platform, updating the tokenized credential on the blockchain platform by updating the metadata of the tokenized credential onchain to dynamically change the limitations that control access by the first party to the data.

2. The computerized method of claim 1, further comprising revoking the tokenized credential when the data is accessed by the first party.

3. The computerized method of claim 1, wherein the first party is a recipient of the data, the second party is a custodian of the data, and the first party initiates the request for data to the second party.

4. The computerized method of claim 1, wherein the proof of identity of the first party comprises a wallet credential or platform user identification.

5. The computerized method of claim 1, further comprising recording a timestamp on the blockchain platform each time the data is accessed.

6. The computerized method of claim 1, wherein the tokenized credential includes a proof of the data, whereby validity of the data can be verified.

7. The computerized method of claim 6, further comprising verifying the validity of the data by checking the data accessed by the first party against the proof of the data of the tokenized credential.

8. The computerized method of claim 1, further comprising providing at least one limitation on accessing the data selected from a group consisting of a deadline for accessing the data, a limit on a number of times to access the data, and an allowed frequency of access to the data.

9. The computerized method of claim 1, wherein the first party or the second party comprises an artificial intelligence agent, and further comprising limiting actions that can be taken by the artificial intelligence agent via parameters set by the tokenized credential.

10. A system for managing distribution of data, comprising:

a non-transitory computer readable storage medium comprising software having programming instructions that, when executed, cause a processor to:

issue a tokenized credential on a blockchain platform, wherein the tokenized credential represents a first party, wherein the tokenized credential comprises metadata defining limitations that control access by the first party to data stored outside of the blockchain platform;

receive, from the first party, a proof of identity of the first party;

allow the first party to access the data stored outside of the blockchain platform in accordance with the limitations in response to receiving the proof of identity of the first party; and after issuing the tokenized credential on the blockchain platform, updating the tokenized credential on the blockchain platform by updating the metadata of the tokenized credential onchain to dynamically change the limitations that control access by the first party to the data.

11. The system of claim 10, wherein a timestamp is recorded each time the data is accessed.

12. The system of claim 10, wherein the first party is a recipient of the data, a second party is a custodian of the data, and the first party initiates a request for data to the second party.

13. The system of claim 10, wherein the proof of identity of the first party comprises a wallet credential or platform user identification.

14. The system of claim 10, wherein the tokenized credential includes a proof of the data, and validity of the data can be verified by checking the data accessed by the first party against the proof of the data of the tokenized credential.

15. The system of claim 10, wherein the limitations comprise one or more of a deadline for accessing the data, a limit on a number of times to access the data, and an allowed frequency of access to the data.

16. The system of claim 10, further comprising a smart contract having rules for updating the tokenized credential.

17. A system for managing distribution of data, comprising:

a server; and a non-transitory computer readable storage medium comprising software having programming instructions that, when executed, cause the server to:

issue a tokenized credential on a blockchain platform in response to a request for data stored outside of the blockchain platform from a first party, wherein the tokenized credential comprises metadata defining limitations that control access by the first party to the data;

allow the first party to access the data stored outside of the blockchain platform in accordance with the limitations in response to receiving a proof of identity of the first party; and after issuing the tokenized credential on the blockchain platform, updating the tokenized credential on the blockchain platform by updating the metadata of the tokenized credential onchain to dynamically change the limitations that control access by the first party to the data.

18. The system of claim 17, wherein the server comprises an artificial intelligence agent, and wherein the metadata of the tokenized credential includes parameters limiting actions that can be taken by the artificial intelligence agent.

19. The system of claim 18, wherein the metadata of the tokenized credential allows the artificial intelligence agent to access only specific parts of the data.

20. The system of claim 18, wherein the parameters permit the artificial intelligence agent to access a portion of the data in response to receipt of a specified financial compensation for access to the portion.

* * * * *